United States Patent [19]
Anderson

[11] Patent Number: 6,009,991
[45] Date of Patent: Jan. 4, 2000

[54] COMPUTER CONTROL SYSTEM FOR STORING AND RETRIEVING ARTICLES ON A CONVEYOR USING ARTICLE IDENTIFICATION

[76] Inventor: William J. Anderson, 1335 Pine St., Glenview, Ill. 60025

[21] Appl. No.: 09/020,543

[22] Filed: Feb. 9, 1998

Related U.S. Application Data

[60] Provisional application No. 60/038,274, Feb. 19, 1997.

[51] Int. Cl.[7] .................................................. B65G 37/00
[52] U.S. Cl. ...................... 198/349; 198/358; 198/349.95
[58] Field of Search ..................................... 198/348, 349, 198/349.1, 349.3, 349.4, 349.5, 349.6, 349.8, 349.95, 358, 465.4

[56] References Cited

U.S. PATENT DOCUMENTS

| | | | |
|---|---|---|---|
| 3,633,736 | 1/1972 | Golden | 198/349.3 X |
| 3,880,298 | 4/1975 | Hubegger et al. | 198/349 X |
| 4,907,699 | 3/1990 | Butcher et al. | 198/349.95 X |
| 4,982,827 | 1/1991 | Seitz et al. | 198/349.8 X |
| 5,299,134 | 3/1994 | Speckhart et al. | 198/349.95 X |

Primary Examiner—James R. Bidwell

[57] ABSTRACT

A controller for automating the loading, unloading, and tracking of items on a power-driven conveyor. One embodiment of the system includes a control unit connected to a conveyor, a database in the control unit for storing article information including the location on the conveyor at which the article is stored, date/time of storage or date/time of retrieval, and article ID number. The conveyor is moved by manual control to a storage location where an article is stored. The article ID number is entered into the database through a keypad, barcode reader, or other electronic device, and the associated storage location, date/time of loading is entered automatically into the controller database. For retrieval, only the article ID need be entered. The controller will lookup the article ID in the database, move the conveyor to the article's location, and update the database with the date/time the article was retrieved. Another embodiment has the database located in a Point-of-sale (POS) computer system to which the controller is connected by a common data interface.

20 Claims, 9 Drawing Sheets

Fig. 1 sensor wiring
to controller

Pickup Point
74

Loading Point
18

COMPUTER CONTROL SYSTEM FOR STORING AND RETRIEVING ARTICLES ON A CONVEYOR USING ARTICLE IDENTIFICATION

I hereby claim the benefit under 35 U.S.C. 119(e) of U.S. provisional application 60/038,274 filed on Feb. 19, 1997.

FIELD OF THE INVENTION

The present invention relates generally to conveyors and conveyor controllers, and more particularly to controllers used to position an endless loop conveyor to a particular location.

BACKGROUND OF THE INVENTION

Power-driven storage systems are used in many applications. One of these applications involves the storage of articles on an endless loop conveyor. Typically, each storage location on the conveyor is marked with a unique number.

To store an article, a human operator moves the conveyor by means of switches controlling the direction of movement of the conveyor. When an empty location is in front of the operator, the operator stops the conveyor. The operator puts the article in the empty location. The number of the location where the article is stored on the conveyor is noted along with the article identification in order to expedite retrieval of the article at a later time.

To retrieve the article, the operator looks at the notes, locates the note containing information on the desired article, and manually operates the conveyor to cause it to move to the location where the article is stored. This requires the operator to watch the location numbers as the conveyor moves, and to stop the conveyor when the desired article storage location is in front of the operator. The operator can then remove the desired article from the conveyor. This type of operation is typical of motor-driven conveyors having only right/left switches to control the conveyor.

An improvement on this technique is to automate the conveyor movement so that the operator simply enters the desired location number into a controller. The controller causes the conveyor to move using the shortest path to the desired location, and then stops the conveyor when the desired location is at the pickup location where the operator is standing. Systems using this technique are available, but suffer from several types of problems.

In one system the conveyor position sensor is mounted directly to the conveyor drive motor shaft. The motor is connected through a drive belt to a gearbox which in turn drives the conveyor. Drive belt slippage in this embodiment results in loss of synchronization between the conveyor position sensor and the conveyor itself, requiring periodic resetting of the controller.

In another system the conveyor is required to be of a special type, having specially designed sensors that are only available from the conveyor manufacturer, thus preventing retrofit of a single type of controller on conveyors from multiple manufacturers.

A further improvement on conveyor controllers is to use a computer database to keep track of the location of stored articles. On storing an article, the selected storage location on the conveyor is stored in the database along with the article identification. Later retrieval is accomplished by the operator selecting the desired article in the database, whereupon the computer containing the database communicates the article's storage location to the controller. The controller then causes the conveyor to move to the article's storage location. In systems using this technique, multiple operators fetching articles off the same conveyor must keep track of who is currently fetching an article, so that when the conveyor automatically stops at an article, the proper operator can be alerted. Also, typical controllers of this type can only be operated from a keypad located at the controller, and have no provision for remote control via a connection to a computer Point-of-sale (POS) system.

An even further improvement on this technique is to display information concerning the article being retrieved on a display located at the controller. In this way one operator does not need to remain at the conveyor while it is moving to a desired location. When the conveyor stops at a storage location, information concerning the article stored there can be displayed. Any operator can then look on the display to determine what to do with the article at the storage location. For example, the display could indicate the name or identifier for the operator who is fetching that article, as well as the article identifier.

Another problem with existing designs is that they provide no capability for communicating the current conveyor location to a database to associate with the identification of a just-stored article. The existing designs all count on the operator accurately noting the location at which an article has been stored. Errors made by the operator in the article location notes requires time-consuming manual search of the conveyor for lost articles.

Still another problem with some existing designs is that they require setting of switches to calibrate the controller to the length of the conveyor (e.g. U.S. Pat. No. 4,484,288).

SUMMARY OF THE INVENTION

The present invention provides a controller incorporating the improvements listed above. The controller automates conveyor movement, and communicates information about the conveyor position to a local database in the controller or to a remotely located database contained in a POS system where the location information is associated with the identification for the article stored at that location. The controller's position sensor mounts on the main drive wheel of the conveyor, thus eliminating any position errors resulting from mounting the sensor further back in the conveyor drive system. In addition, the controller can be electrically retrofit to and physically mounted on conveyors of various lengths from various manufacturers, automatically adjusting for the conveyor length. A local display provides information on the article being fetched and on controller status. The controller provides an interface capable of communicating with a POS system as well as other accessories such as scanners.

The foregoing features and advantages of the present invention will be apparent from the following more particular description of the invention. The accompanying drawings, listed hereinbelow, are useful in explaining the invention.

DETAILED DESCRIPTION OF THE INVENTION

Figure 1:
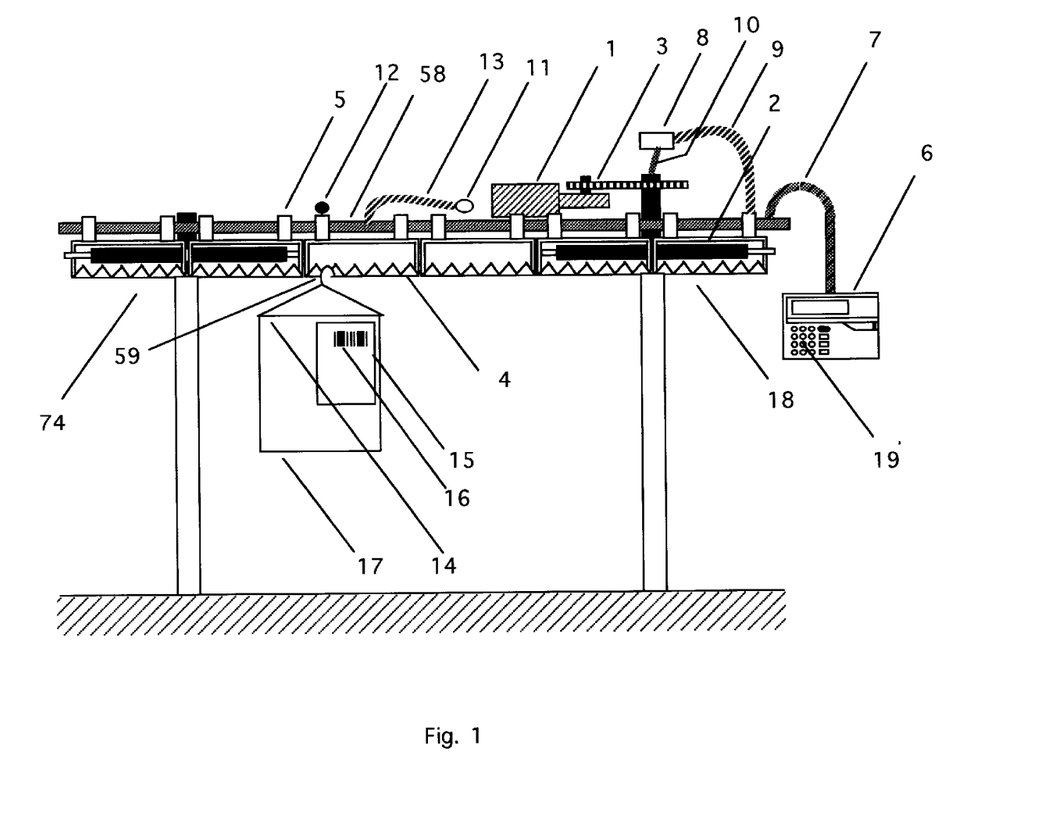
FIG. 1 presents a pictorial representation of a preferred embodiment of the present invention.
Figure 7:
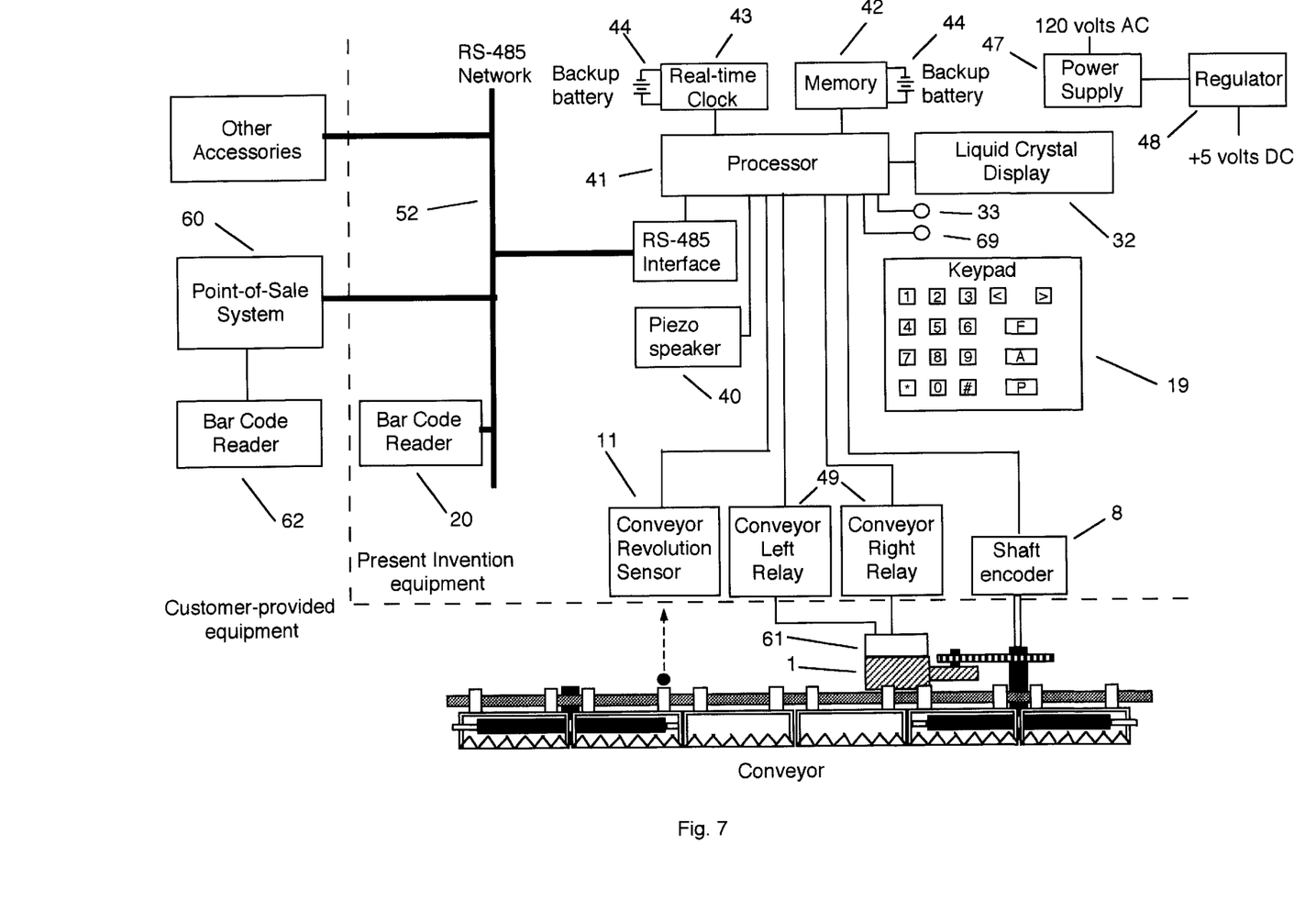
FIG. 7 depicts a system block diagram of the present invention.

Referring first to FIGS. 1 and 7, a motor 1 drives the main wheel 2 of an endless loop conveyor through chain drive 3. Hanger bars 4 attached to rollers 5 riding on conveyor rail 58 are driven around the conveyor by the main wheel 2. A controller 6 mounted to the conveyor by adjustable pipe 7 senses conveyor location and rotation through a shaft encoder 8 mounted to the conveyor by flex pipe 9 and coupled to the main wheel 2 of the conveyor through flexible coupling 10. The controller 6 also detects each complete revolution of the conveyor by monitoring the output of conveyor revolution sensor 11 which changes state as magnet 12 mounted on a hanger bar 4 passes by. Conveyor revolution sensor 11 is also mounted to the conveyor by flex pipe 13. The controller 6 contains relays 49 which in turn are connected to the conveyor motor control 61, allowing the controller 6 to operate the conveyor motor 1. Clothes on hangers 14 are hung on hanger bars 4. Invoice 15 containing invoice number barcode 16 is fastened to the bag protecting the clothes 17.

To store items on the conveyor, the operator first puts the controller 6 in the ADD (loading) mode by pressing the A key on the keypad 19. He then moves the conveyor using the < > buttons on the controller keypad 19, until a storage location 59 is positioned at the loading point 18. The processor 41 determines the current location of the conveyor by continuously monitoring conveyor movement through shaft encoder 8 and conveyor revolution sensor 11. A hanger 14 containing clothes is hung at a storage location 59. The operator then enters the invoice number 16 using the keypad 19 on the controller 6 or the barcode reader 20 to scan the invoice number barcode 16 printed on the invoice 15. The processor 41 stores the invoice number 16 in its local memory 42 along with the storage location 59 where the item was stored and the date and time of the storage from real-time clock 43. The operator stores a copy of the invoice 15 containing invoice number barcode 16 for use on retrieval. While specific buttons are described, it will be understood by those skilled in the art that other buttons could be used for similar control of operations.

To retrieve items from the conveyor, the operator first puts the controller 6 in the PICKUP mode by pressing the P key on the keypad 19. He then locates an invoice copy for the article he wants to retrieve, enters the invoice number 16 of the desired item using the keypad 19 on the controller 6 or by scanning a copy of the invoice number barcode 16 using the barcode reader 20. The processor 41 looks up the storage location 59 that is associated with the invoice number 16 in its memory 42. The processor 41 activates the appropriate relay 49 causing motor 1 to rotate the conveyor in the direction having the shortest path to the storage location 59, and stops it so that the storage location 59 is in front of the pickup point 74. Pickup LED 33 is illuminated to alert the operator to the reason the conveyor was stopped. The operator picks the desired item 14 off the conveyor and then pushes the > button on the keypad 19 to indicate the pickup to the processor 41. The processor 41 updates its local memory 42 with the date and time of pickup for that item, and turns off the Pickup LED 33. If the processor 41 is in the middle of rotating the conveyor to a location for pickup while another invoice number 15 is entered for pickup, the second (third, etc.) invoice numbers are stored in a queue in the processor local memory 42, and the More LED 69 is illuminated indicating to the operator that additional items are yet to be fetched. Upon the operator pushing > on the keypad 19 to indicate the pickup to the processor 41, the processor 41 will automatically start to fetch the next item in the queue, if any. When the queue is empty, the processor 41 turns off the More LED 69.

In installations where the controller 6 is interfaced to a POS system 60, operation is as follows. To store items on the conveyor, the operator first puts the controller 6 in the ADD mode by pressing the A key on the keypad 19, or alternatively the POS system 60 commands the controller 6 through an RS-485 network 52 to go into ADD mode. He then moves the conveyor using the < > buttons on the controller keypad 19, until a storage location 59 is positioned at the loading point 18. Alternatively, a POS system 60 sends a command through network 52 to the processor 41 to move the conveyor to a storage location 59. The processor 41 determines the current location of the conveyor by continuously monitoring conveyor movement through shaft encoder 8 and conveyor revolution sensor 11. A hanger 14 containing clothes is hung at a storage location 59. The operator then enters the invoice number 16 using the keypad 19 on the controller 6 or uses the barcode reader 20 to scan the invoice number barcode 16 printed on the invoice 15. The controller sends the invoice number 16 to the POS system 60 through network 52 along with the current conveyor location. Alternatively the barcode reader 62 on the POS system 60 can be used to scan the invoice number 16, the POS system 60 then commanding the controller 6 to send its current location to the POS system 60, where the POS system 60 stores the current conveyor location and the invoice number 16 in its database along with the article identification 15. To retrieve an article 14, the operator first puts the controller 6 in the PICKUP mode by pressing the P key on the keypad 19. Alternatively, the POS system 60 can command the controller 6 over network 52 to go into the PICKUP mode. The operator then uses the POS system 60 to identify the article 14 in its database, after which the POS system 60 commands the controller 6 over network 52 to move the conveyor to the storage location 59 where the article 14 is located. The processor 41 activates the appropriate relay 49 causing motor 1 to rotate the conveyor in the direction having the shortest path to the storage location 59, and stops it so that the storage location 59 is in front of the pickup point 74. Pickup LED 33 is illuminated to alert the operator to the reason the conveyor was stopped. The operator picks the desired item 14 off the conveyor and then pushes the > button on the keypad 19 to indicate the pickup to the processor 41. The processor 41 turns off the Pickup LED 33. If the processor 41 is in the middle of rotating the conveyor to a location for pickup while another invoice number 15 is entered for pickup, the second (third, etc.) invoice numbers are stored in a queue in the processor 41 local memory 42, and the More LED 69 is illuminated indicating to the operator that additional items are yet to be fetched. Upon the operator pushing > on the keypad 19 to indicate the pickup to the processor 41, the processor 41 will automatically start to fetch the next item in the queue, if any. When the queue is empty, the processor 41 turns off the More LED 69.

Figure 2:
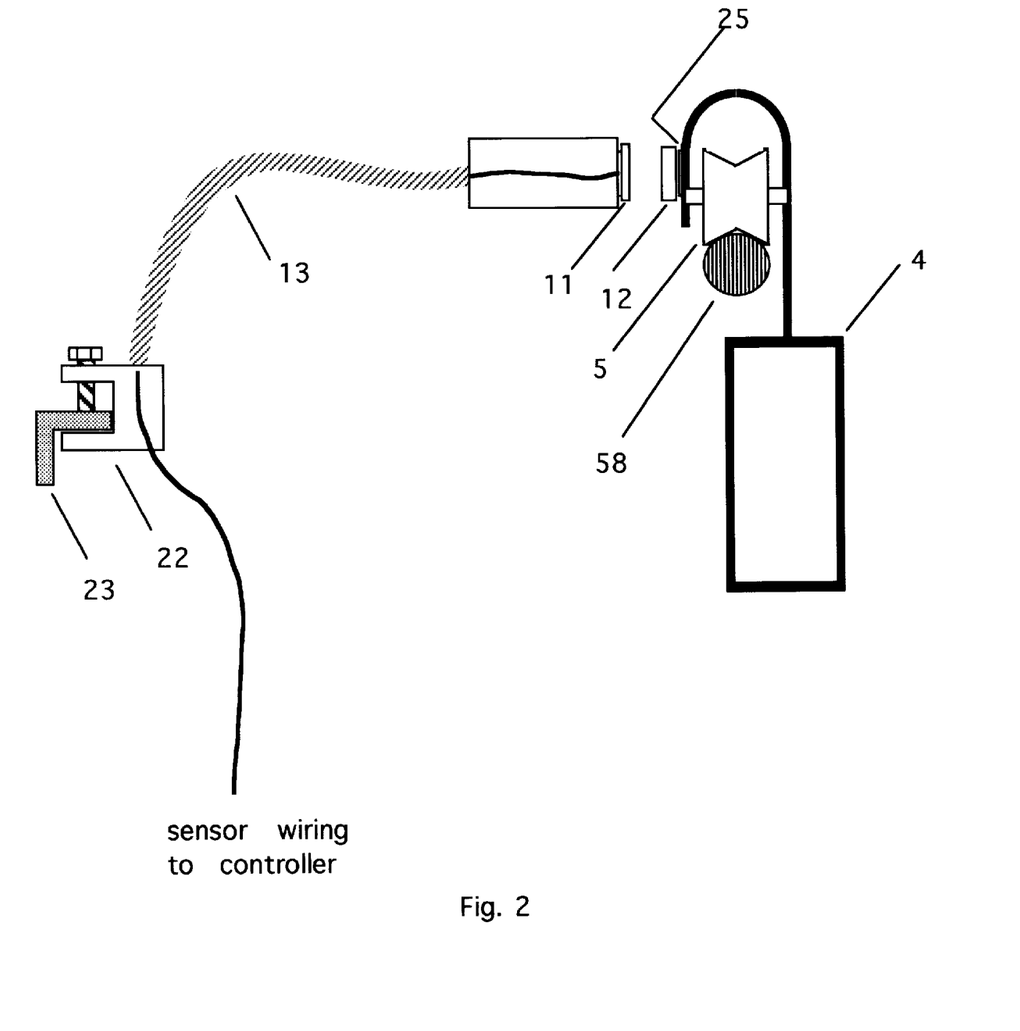
FIG. 2 depicts a method of mounting the conveyor revolution sensor and magnet.

Referring to FIG. 2, the conveyor revolution sensor 11 is mounted to the conveyor frame 23 using flex pipe 13 and beam clamp 22. The beam clamp 22 allows quick and easy fastening to convenient points on most types of conveyor frames without drilling holes or modifying the conveyor frame. Once clamped to the conveyor frame, the flex pipe 13 can be bent to position the conveyor revolution sensor 11 to its best operational position. A magnet 12 is fastened to a portion of a hanger bar 4 using double-sided foam tape 25.

Figure 3:
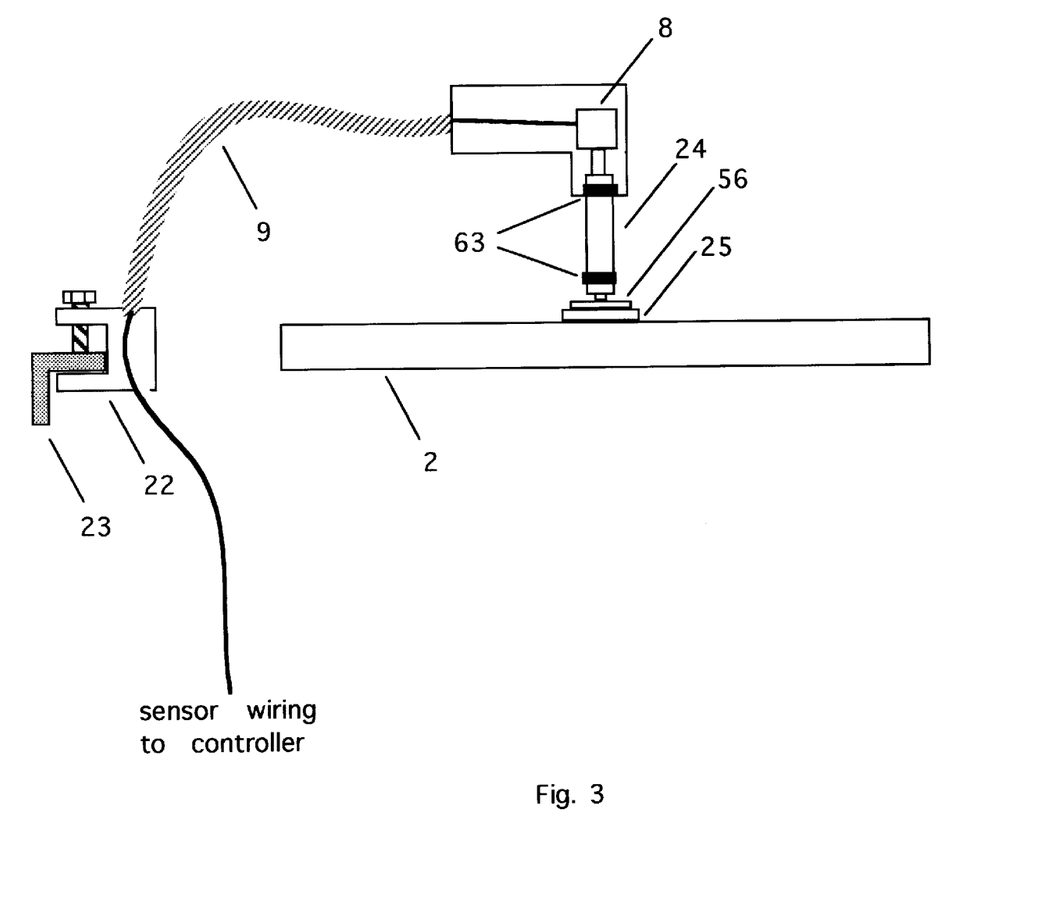
FIG. 3 depicts a method of mounting the shaft encoder assembly to the conveyor main drive wheel.

Referring to FIG. 3, the shaft encoder 8 is mounted to the conveyor frame 23 using flex pipe 9 and beam clamp 22. The beam clamp 22 allows quick and easy fastening to convenient points on most conveyor types without drilling holes or modifying the conveyor frame. Once clamped to the conveyor frame, flex pipe 9 can be bent to position the shaft encoder to its best operational position. The shaft encoder 8 is coupled to the center of rotation of the conveyor drive wheel 2 using a piece of flexible tubing 24 a bracket 56, and clamps 63, thus reducing the need for accurate positioning of the encoder over the center of rotation.

Figure 4:
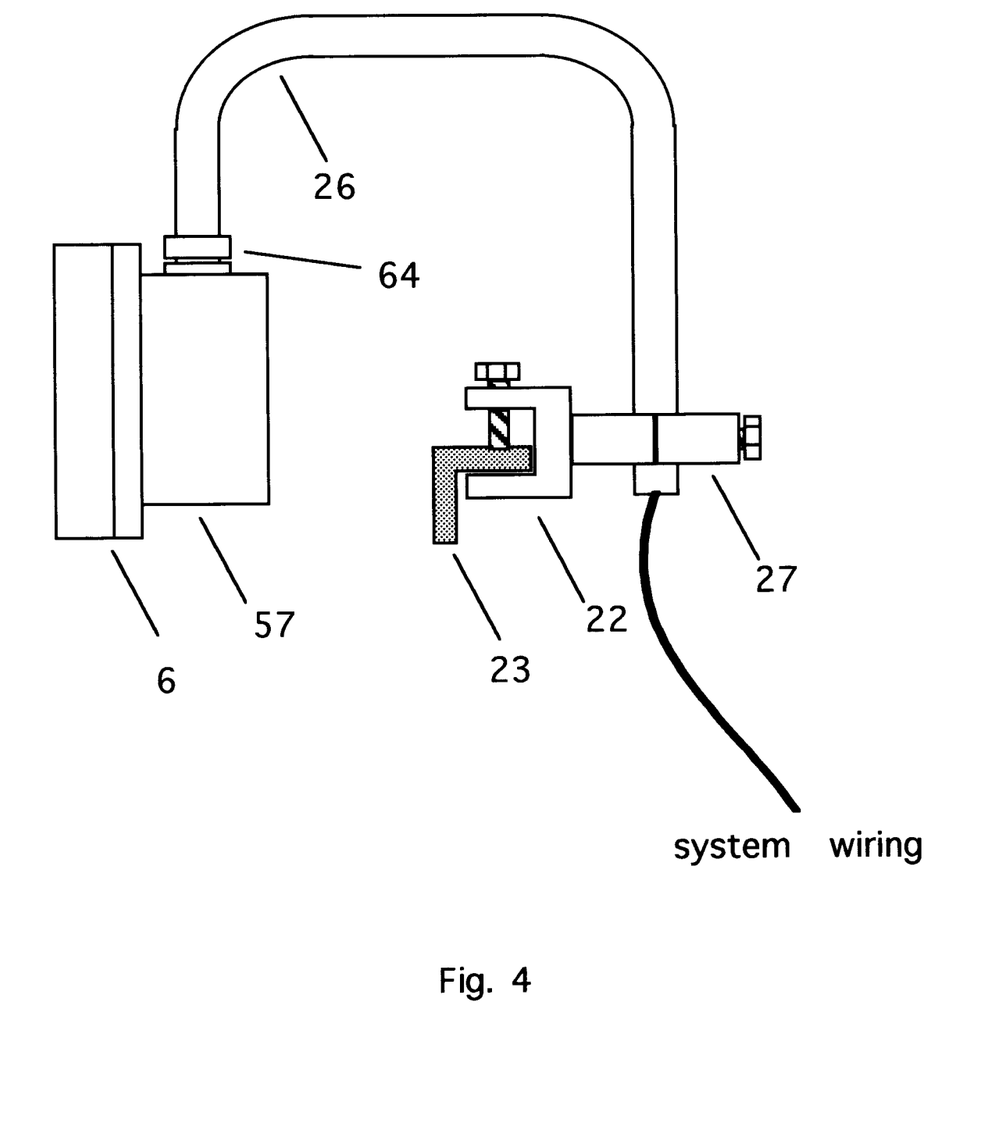
FIG. 4 depicts a method of mounting the controller assembly to the conveyor frame.

Referring to FIG. 4, the controller 6 is mounted to a 2-gang electrical outlet box 57 which is in turn mounted to the conveyor frame 23 using electrical conduit 26 and conduit clamp 64 fastened through a pipe clamp 27 to beam clamps 22 that are in turn fastened to the conveyor frame 23. This arrangement allows mounting on most conveyors, and in addition allows positioning the controller 6 at various positions along the conveyor. The operational height of the controller from the floor can be adjusted by loosening the pipe clamp 27 and sliding the conduit 26 up and down in the pipe clamp 27, then re-tightening the pipe clamp 27.

Figure 5A:
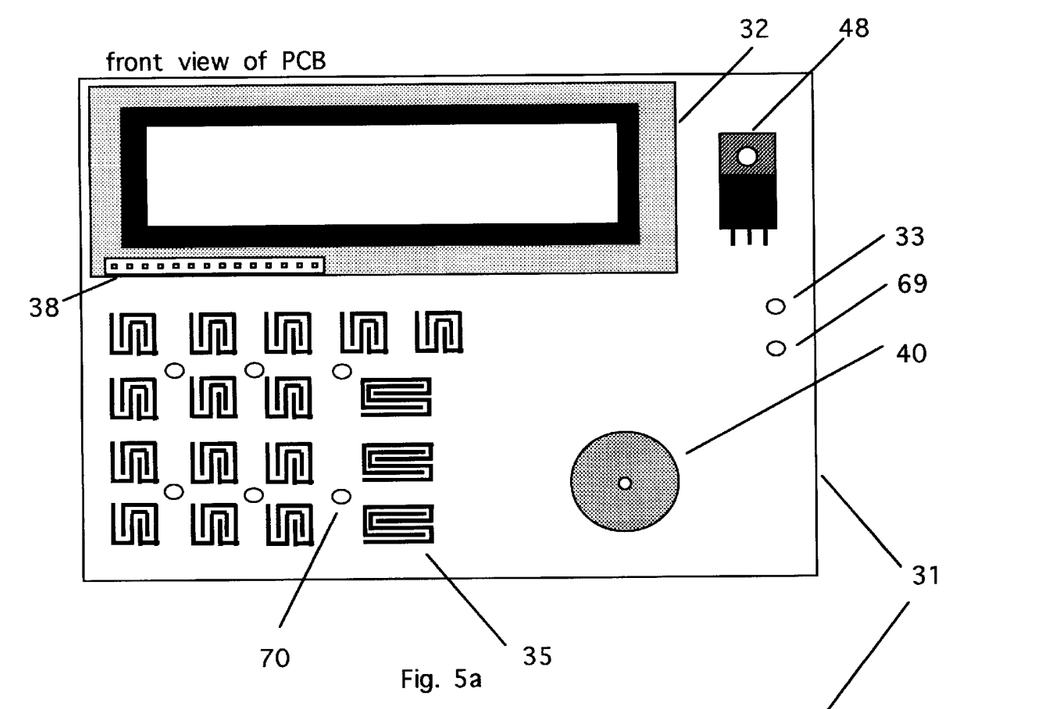
FIGS. 5a and 5b respectively depict front and rear views of an embodiment of the controller printed circuit board assembly.
Figure 5B:
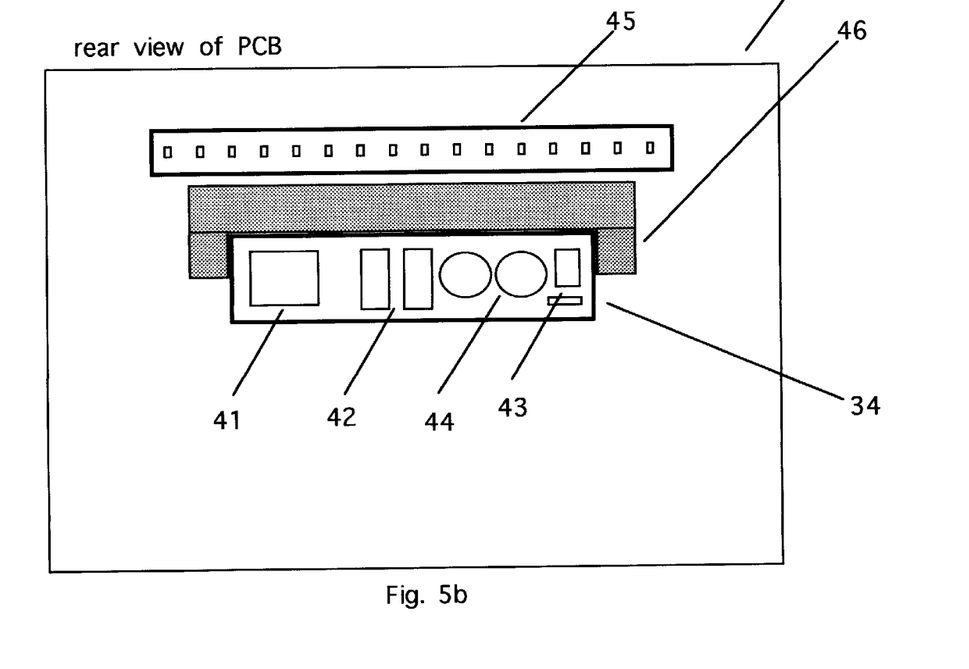
Figure 6:
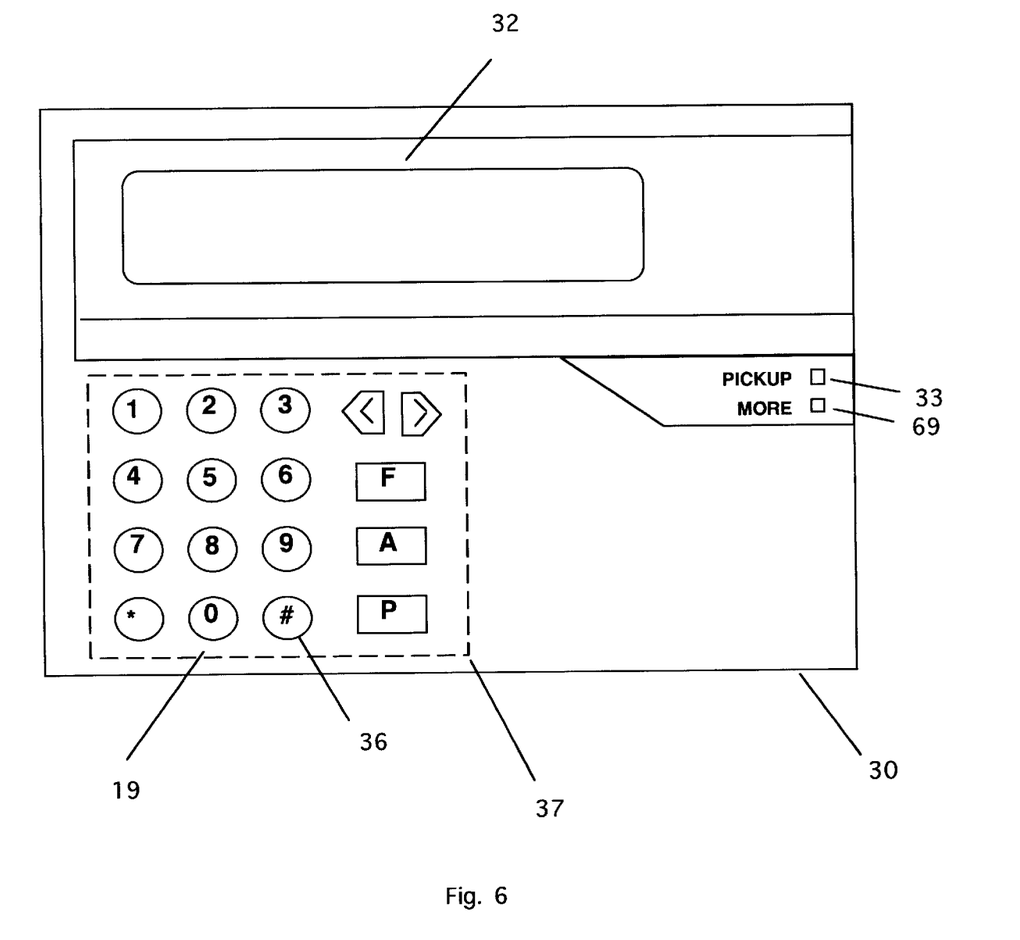
FIG. 6 depicts an embodiment of the front panel of the controller.

Referring to FIGS. 5, 6 and 7 the controller 6 itself can be broken down into various component parts. The case 30 is made of molded plastic and provides for snap-in mounting of the printed circuit board (PCB) 31, as well as windows for a liquid crystal display (LCD) 32 and light emitting diodes (LEDs) 33 and 69 to shine through. This arrangement provides for quick assembly/disassembly for service.

The PCB 31 connects together all the main electronic components of the controller, as well as serving as one element of the keypad 19. A two-piece connector 45 on the back of the PCB allows easy removal/reassembly of the PCB into the system without disconnecting any individual wires from the system. Another connector 46 on the back of the PCB provides mounting for the microprocessor subassembly 34, and allows easy removal/replacement of the microprocessor subassembly 34 for service. A power supply 47 and voltage regulator 48 provide system power.

The keypad 19 consists of three parts: a printed circuit pattern 35 on the PCB 31, a carbon-impregnated silicone button assembly 36, and a clear plastic light pipe 37 for diffusing the light from the keypad backlight LEDs 70.

A 16 character by 2 line LCD 32 is connected to the PCB 31 by a connector 38 and mounting screws allowing for easy removal/replacement of this component. The LCD 32 is backlit to provide for viewing in poorly lit areas.

A piezo speaker 40 provides acoustic feedback from the controller 6 to the operator.

The microprocessor subassembly 34 is another small PCB housing the microprocessor 41, memory 42, real-time clock 43, and backup batteries 44. Since the backup batteries are contained on this assembly, both the memory 42 and real-time clock 43 operation are retained during power loss, and even with the microprocessor subassembly 34 removed from its socket on the PCB 31.

During installation, the installer uses the keypad 19 to put the controller into setup modes. One of these modes displays on the LCD 32 an indication of the state of the conveyor revolution sensor 11. If the conveyor revolution sensor 11 detects the magnet 12 is in its immediate proximity, the LCD display 32 indicates ON. If no magnet is detected, the LCD 32 indicates OFF. By moving the conveyor manually using the 2 and 3 keys on the keypad 19, the installer can move the conveyor manually until the magnet 12 is immediately in front of the conveyor revolution sensor 11. He can then adjust the position of the flex pipe 13 to minimize the distance between the magnet 12 and the conveyor revolution sensor 11 until the LCD display 32 reads ON.

In a similar fashion, another mode is available to check the operation of the shaft encoder 8. This mode allows the installer to move the conveyor manually using the 2 and 3 keys on the keypad 19. The LCD display 32 will show a number which will increase and decrease relative to conveyor motion. If the number does not change with conveyor movement, or changes erratically, the installer knows that the shaft encoder 8 is not mounted or connected properly.

Another setup mode is available to calibrate the controller 6 for conveyors of various lengths. Once the installer has the shaft encoder 8 and the conveyor revolution sensor 11 operating properly as indicated by their respective setup modes (described above), he can then proceed to the auto calibrate mode. In this mode, the processor 41 causes the conveyor to rotate in one direction. As the processor 41 detects the state change of the conveyor revolution sensor 11 as magnet 12 passes in front of the conveyor revolution sensor 11, the processor 41 starts keeping track of the number of pulses from the shaft encoder 8. When the second passage of magnet 12 is detected by the conveyor revolution sensor 11 and passed on to the processor 41, the processor 41 stores the total number of pulses received from the shaft encoder 8 during the complete conveyor revolution in its local memory 42. Conveyor storage locations 59 can now be identified by the number of shaft encoder 8 pulses encountered in rotating the conveyor from the location where the magnet 12 is sensed by the conveyor revolution sensor 11 to the desired storage location 59. The processor 41 continuously monitors the number of shaft encoder 8 pulses received since the last state change of conveyor revolution sensor 11, thus knowing the conveyor position at any point in time with respect to the number of shaft encoder 8 pulses away in a given direction from the position where magnet 12 causes a state change in conveyor revolution sensor 11.

Figure 8:
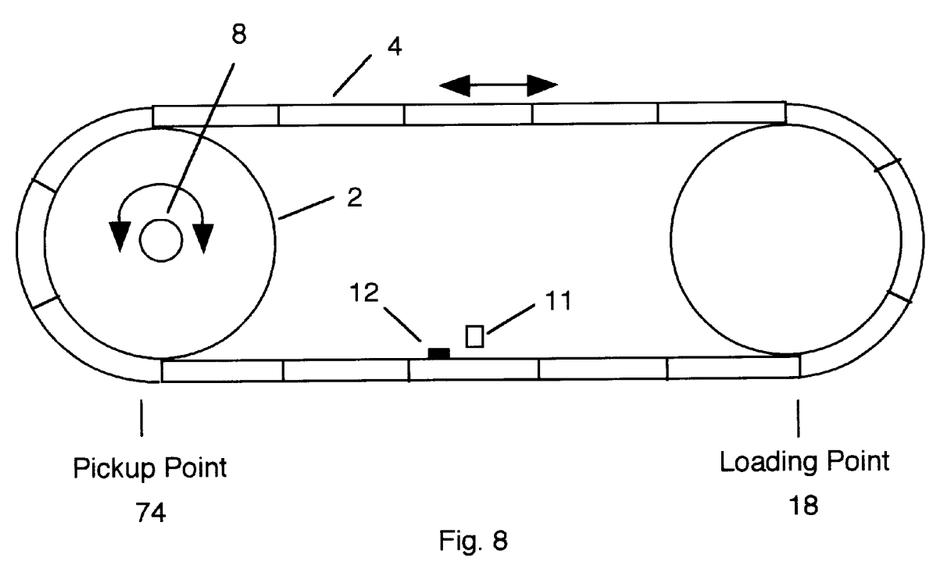
FIG. 8 presents a graphic representation of the shaft encoder to conveyor coupling, the conveyor revolution sensor to magnet relationship, and one example of pickup and loading points.
Figure 9:
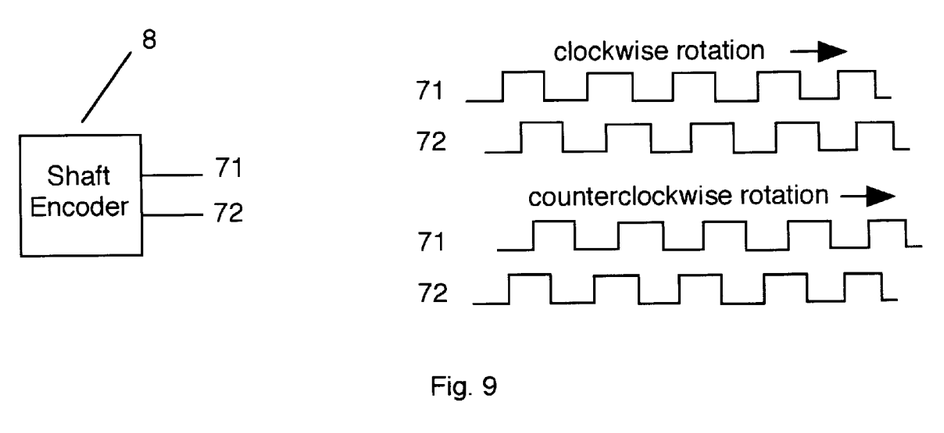
FIG. 9 depicts the quadrature relationship of the shaft encoder outputs 71 and 72.

Referring to FIGS. 7, 8, and 9, the processor 41 detects shaft encoder 8 (and thus conveyor) rotation in the following way. Shaft encoder 8 is a commonly available incremental encoder, having outputs 71 and 72 in quadrature with each other. As the shaft encoder 8 rotates, the outputs 71 and 72 change state in sequence according to the direction of rotation. Encoders with various resolutions (the number of output state changes per revolution) can be accommodated, but a typical resolution of 32 state changes per revolution is sufficient for this conveyor application. With a conveyor drive wheel 2 circumference of 84 inches (a typical value), and a shaft encoder 8 having 32 state changes per revolution, each shaft encoder 8 state change will represent about 2.6 inches of conveyor movement. Processor 41 samples the shaft encoder 8 outputs 71 and 72 periodically, a typical period being ten milliseconds. When a change in state of one of the outputs 71 or 72 is detected, the processor 41 samples the outputs 71 and 72 an additional number of times. When the change in the output state stays fixed for two additional samples, the processor 41 accepts the change in state as legitimate, and increments the conveyor location in its memory 42. When magnet 12 passes conveyor revolution sensor 11, the processor 41 detects the change in state of the conveyor revolution sensor 11. The processor 41 adjusts the conveyor location in memory 42 based on the direction the conveyor was going as magnet 12 passed the conveyor revolution sensor 11. If the conveyor was going in the direction where the processor 41 was incrementing the conveyor location in memory 42, processor 41 will adjust the conveyor location to the lowest usable conveyor location number, or to the highest usable location number if the conveyor was going in the direction where processor 41 was decrementing the conveyor location in memory 42.

Conveyors develop inertia while moving, due to the weight of the conveyor and the items loaded on the conveyor. This inertia results in drift past a desired stopping location. To compensate for this drift, the present invention has a setup mode that allows the user to enter a drift-to-stop allowance. When the controller 6 is moving the conveyor automatically to a selected location, the controller 6, after detecting that the conveyor is within the drift-to-stop allowance of the selected location, will remove power from the conveyor motor 1, allowing the conveyor to drift to stop at the selected location.

Conveyors can be installed in such a way that it is desirable to load the conveyor at a different point than is used to pick items off the conveyor on retrieval. To accommodate this need, the controller 6 program provides a setup mode wherein the user can define both a loading location 18 and a pickup location 74 that will be used by the operator for loading and pickup activities respectively. The location of the load and pickup points 18 and 74 is made transparent to the user by the processor 41. The processor 41 always defines the current location of the conveyor with respect to the pickup point 74. If the loading point 18 is setup at a different location than the pickup point 74, the processor 41 adjusts the conveyor location that is stored for an article by the offset (in shaft encoder pulses) from the loading point 18 to the pickup point 74.

The present invention allows a POS system 60 to send text over network 52 to the controller 6 to be displayed on the LCD display 32. This feature can be used to display information concerning an article 14 being retrieved, or to guide the user on what to do next. In this way, the controller 6 allows for varying interfaces with many different POS systems.

When a POS system 60 commands the controller 6 to go to a location while the controller 6 is in PICKUP mode, the POS system 60 can send the command with one of two priorities. The first priority indicates to the controller 6 that the requested location is to be put into the queue with the next available priority. Locations requested in this manner will be gone to in the order in which they have been received from the POS system 60 by the controller 6. The second priority indicates to the controller 6 that the requested location is to be grouped and gone to in sequence with other requests having the same priority. In this manner articles needing to be grouped together after retrieval can be retrieved in order without fetching other non-related articles in between.

While the invention has been particularly shown and described with reference to a particular embodiment thereof it will be understood by those skilled in the art that various changes in form and detail may be made therein without departing from the spirit and scope of the invention.

I claim:

1. In a system that includes a loop conveyor for carrying a plurality of identifiable articles and a motor means for driving said conveyor, a controller comprising, in combination, a) a microprocessor;
 b) a shaft encoder coupled to said conveyor and providing outputs responsive to the movement of said conveyor, said outputs being electronically connected to said microprocessor;
 c) a conveyor revolution sensor connected to said microprocessor and coupled to said conveyor for sensing a reference for each revolution of said conveyor;
 d) output devices responsive to said microprocessor for activating said motor means; and
 e) program means for said microprocessor for providing system control for starting said conveyor, and for stopping said conveyor at a selected location.

2. In a system that includes a loop conveyor for carrying a plurality of identifiable articles and a motor means for driving said conveyor, a controller comprising, in combination, a) a microprocessor;
 b) a shaft encoder coupled to said conveyor and providing outputs responsive to the movement of said conveyor, said outputs being electronically connected to said microprocessor;
 c) a conveyor revolution sensor connected to said microprocessor and coupled to said conveyor for sensing a reference for each revolution of said conveyor;
 d) output devices responsive to said microprocessor for activating said motor means;
 e) program means for said microprocessor for providing a prioritizing control for starting said conveyor, and for stopping said conveyor at an identified location, in logical and sequential sequence in response to more than one input from one or more operators at any time;
 f) means for selecting the conveyor location to which said articles are stored and from which said articles are retrieved; and
 g) a display and a keypad connected to said microprocessor for providing a human interface.

3. A controller according to claim 1 wherein said conveyor revolution sensor senses a magnet mounted on the moving portion of said conveyor.

4. A controller according to claim 1 including at least one communication port, such as for communication with accessories and with external POS (Point-of-sale) systems.

5. A controller according to claim 1 wherein said microprocessor includes a memory having a database of information about said articles on said conveyor including said conveyor locations where said articles are stored and said article identifiers.

6. A controller according to claim 5 wherein said database contains additional information concerning said articles stored on said conveyor including the date and time said articles were stored, the date and time said articles were retrieved, and flags indicating which of said articles are currently in the queue for retrieval and their position in the queue.

7. In a system that includes a loop conveyor for carrying a plurality of identifiable articles, a motor means for driving said conveyor and a controller comprising, in combination, a microprocessor;

a shaft encoder coupled to said conveyor and providing outputs responsive to the movement of said conveyor, said outputs being electronically connected to said microprocessor;

a conveyor revolution sensor connected to said microprocessor and coupled to said conveyor for sensing a reference for each revolution of said conveyor;

output devices responsive to said microprocessor for activating said motor means; and program means for said microprocessor for providing system control for starting said conveyor, and for stopping said conveyor at a selected location;

a method of adjusting said controller to conveyors consisting of the steps of:
  a) providing a reference to said microprocessor to indicate the start of a conveyor revolution;
  b) said microprocessor counting the number of shaft encoder pulses received during a complete revolution of the conveyor until receiving the next said reference;
  d) providing a reference to indicate the start or end of a conveyor revolution and inputting said reference to said microprocessor for the purpose of re-initializing said shaft encoder pulses with respect to the position of the conveyor.

8. A controller according to claim 4 wherein multiple controllers can communicate with each other and with other said accessories or Point-of-sale system over said communication port.

9. A controller according to claim 5 wherein said database containing said information concerning said articles stored on said conveyor is located in said external Point-of-sale system which communicates with said controller over said communication port.

10. A controller according to claim 4 wherein said external Point-of-sale system connected to said controller by said communication port can remotely control operation of said controller, and request from said controller the current location of said conveyor.

11. A controller according to claim 1 that can be set to turn off said motor means a programmable distance prior to said selected location, thus accommodating conveyor inertia that causes said conveyor to continue moving after said motor means have been turned off.

12. A controller according to claim 1 wherein conveyor loading and pickup locations can be programmed to be at different locations on the perimeter of said conveyor.

13. A controller according to claim 1 wherein the controller program status is maintained in non-volatile memory so power failure and restart result in automatic program resumption at the point of power failure instead of restarting the microprocessor program at its beginning.

14. A controller according to claim 1 wherein said shaft encoder assembly and said conveyor revolution sensor assembly are respectively mounted to said conveyor using flexible pipe in order to accommodate mounting on varied types of said conveyors.

15. A controller according to claim 10 wherein said Point-of-sale system can send textual information to be shown on said display of said controller.

16. A controller according to claim 10 wherein retrieval requests from said Point-of-sale system can be tagged with a priority so that requests for separate articles belonging to a group are retrieved in sequence before other articles.

17. A controller according to claim 1 wherein said microprocessor program compensates for conveyor inertia on stopping by removing power from said motor means a set number of shaft encoder pulses before a selected location is reached, said set number of shaft encoder pulses being programmable by the user.

18. A controller according to claim 5 wherein identifying tags are fastened to said articles and means are provided for scanning said tags to provide said article identification data including said conveyor location to said database.

19. A controller according to claim 1 wherein said program means includes separate modes for loading and removing said articles from said conveyor.

20. A control for a loop conveyor for carrying a plurality of identifiable articles and a motor means for driving said conveyor, a controller comprising, in combination,
  a) means for identifying said conveyor location where each said article is stored;
  b) a microprocessor;
  c) display and keypad means coupled to said microprocessor for enabling one or more operators to input article information at any time;
  d) a shaft encoder assembly mounted to the conveyor using flexible pipe in order to accommodate mounting on varied types of conveyors, said encoder providing outputs responsive to the movement of said conveyor, said outputs being electronically connected to said microprocessor;
  e) stationary magnetic sensor means interacting with a movable magnetic means to provide a reference of the start of a conveyor revolution, said stationary magnetic means being mounted to the conveyor using flexible pipe to accommodate conveyors of varied types;
  f) output devices responsive to said microprocessor for activating said motor means; and
  g) program means for said microprocessor for providing a prioritizing control for starting said conveyor, and for stopping said conveyor at an identified location, in logical and sequential sequence in response to more than one input from one or more operators at any time.

* * * * *